US012432490B2

(12) United States Patent
Voishvillo

(10) Patent No.: US 12,432,490 B2
(45) Date of Patent: Sep. 30, 2025

(54) DUAL COMPRESSION DRIVER WITH ANNULAR EXIT

(71) Applicant: Harman Professional, Inc., Northridge, CA (US)

(72) Inventor: Alexander Voishvillo, Simi Valley, CA (US)

(73) Assignee: Harman Professional, Inc., Northridge (CA)

( * ) Notice: Subject to any disclaimer, the term of this patent is extended or adjusted under 35 U.S.C. 154(b) by 173 days.

(21) Appl. No.: 18/390,730

(22) Filed: Dec. 20, 2023

(65) Prior Publication Data

US 2025/0211897 A1 Jun. 26, 2025

(51) Int. Cl.
*H04R 1/34* (2006.01)
*H04R 1/02* (2006.01)
*H04R 1/24* (2006.01)
*H04R 7/12* (2006.01)

(52) U.S. Cl.
CPC ............. *H04R 1/345* (2013.01); *H04R 1/025* (2013.01); *H04R 1/24* (2013.01); *H04R 7/12* (2013.01); *H04R 2201/34* (2013.01)

(58) Field of Classification Search
CPC .......... H04R 1/345; H04R 1/025; H04R 1/24; H04R 7/12
USPC ......................... 381/343, 150, 337, 339, 340
See application file for complete search history.

(56) References Cited

U.S. PATENT DOCUMENTS 8,280,091 B2 10/2012 Voishvillo
8,831,270 B1 * 9/2014 Dimitrov ................. H04R 1/30 381/401
10,038,954 B2 7/2018 Voishvillo
10,382,860 B2 8/2019 Spillmann et al.
10,531,200 B2 1/2020 Voishvillo
2018/0255399 A1 9/2018 Voishvillo

FOREIGN PATENT DOCUMENTS

WO 2022115106 A1 6/2022

OTHER PUBLICATIONS

Voishvillo, "Dual Diaphragm Compression Drivers", Audio Engineering Society, 131st Convention, New York, NY, Oct. 20-23, 2011, 12 pages.
Extended European Search Report for Application No. 24219687.1, dated May 22, 2025, 7 pages.

* cited by examiner

*Primary Examiner* — Thjuan K Addy
(74) *Attorney, Agent, or Firm* — Brooks Kushman P.C.

(57) ABSTRACT

A dual compression driver includes first driver assembly and a second driver assembly each including a motor assembly disposed about a central axis, an annular diaphragm coaxial to and operably connected to each motor assembly, and a phasing plug coaxial to each diaphragm. Each phasing plug includes an input side oriented toward the diaphragm, an output side oriented away from the diaphragm, and a plurality of apertures extending therethrough. A hollow extension duct has a bottom end mounted to the phasing plug of the first driver assembly, wherein an inner surface of the extension duct and an outer surface of the second driver assembly form an annular pathway terminating at an annular exit of the dual compression driver. Acoustic signals from the first and second driver assemblies merge between the output sides of the phasing plugs and radiate radially outward to the annular pathway and through the annular exit.

20 Claims, 10 Drawing Sheets

DUAL COMPRESSION DRIVER WITH ANNULAR EXIT

TECHNICAL FIELD

Embodiments relate to a dual compression driver with an annular exit to the waveguide or horn.

BACKGROUND

Dual compression drivers include two annular diaphragms, where the diaphragms either have the same profile and work in the same frequency range or have different profiles and radiate in different frequency bands. In addition to the two diaphragms, a dual compression driver includes two motor assemblies and two phasing plugs. The phasing plugs are positioned to face each other and the diaphragms radiate through two acoustic chambers that have a mutual acoustic load (waveguide or horn).

Comparing a dual compression driver with a regular driver having a dome diaphragm and the same diameter of the voice coil, the moving mass of each diaphragm in the dual compression driver is lower because the mass is split between the two diaphragms. Advantageously, a lower moving mass extends the high-frequency range of the dual compression driver. Having two voice coils instead of one decreases the thermal compression and increases the dynamic range and the maximum SPL (sound pressure level), because the same level of the output acoustic signal is reached at a smaller displacement of each voice coil and each diaphragm. For the same reason, the distortion at low frequencies is smaller as well in dual compression drivers compared with regular drivers.

Existing dual compression drivers utilize a circular exit. The diameter of the exit is related to cross-modes that are excited at the entrance of the corresponding horn or waveguide, and to the directivity control at high frequencies. In a constant-directivity waveguide, control of directivity is lost when the diameter of the exit of the driver (equal to the diameter of the waveguide or horn entrance) is comparable to the wavelength of the radiated signal. The same effect is observed in waveguides used in line arrays, where larger exit diameters worsen the high-frequency directivity control.

In line arrays, the entrance of the waveguide is typically circular, whereas the exit of the waveguide is typically rectangular with its vertical dimension significantly larger than the horizontal dimension. As such, wide directivity is provided in the horizontal plane and narrow directivity is provided in the vertical plane. The goal of waveguides in line arrays is to transform the circular entrance to the rectangular exit and provide a "flat" wavefront in the vertical plane, creating a cylindrical wave instead of a spherical one when a number of line arrays is stacked vertically and a single or several waveguides form a very long vertically oriented radiator. This is accomplished via the progressive time delay of sound waves towards the middle of the vertically-oriented exit in such a way that the arrival time of sound waves is equal along the vertical profile of the waveguide. In all such drivers with a circular exit and corresponding circular entrance to the waveguide, the acoustical path must narrow to reach the exit of the driver, and then start widening again in the waveguide, creating unnecessary redundancy.

SUMMARY

In one or more embodiments, a dual compression driver includes a first driver assembly including a first motor assembly disposed about a central axis at a first end of the dual compression driver, a first annular diaphragm disposed coaxially above and operably connected to the first motor assembly, and a first phasing plug disposed coaxially above the first annular diaphragm, the first phasing plug including an input side oriented toward the first annular diaphragm and an output side oriented away from the first annular diaphragm, the first phasing plug including a first plurality of apertures extending therethrough. A second driver assembly includes a second motor assembly disposed about the central axis at a second end of the dual compression driver, a second annular diaphragm disposed coaxially below and operably connected to the second motor assembly, and a second phasing plug disposed coaxially below the second annular diaphragm, the second phasing plug including an input side oriented toward the second annular diaphragm and an output side oriented away from the second annular diaphragm, the second phasing plug including a second plurality of apertures extending therethrough. A hollow extension duct has a bottom end mounted to the first phasing plug and a top end extending toward the second end of the dual compression driver, wherein an inner surface of the extension duct and an outer surface of the second driver assembly form an annular pathway terminating at an annular exit at the second end of the dual compression driver. Acoustic signals from the first plurality of apertures merge with acoustic signals from the second plurality of apertures between the output side of the first phasing plug and the output side of the second phasing plug and radiate radially outward to the annular pathway and through the annular exit.

In one or more embodiments, the second driver assembly includes a housing mounted at the second end of the dual compression driver, a side surface of the housing forming at least part of the annular pathway. In one or more embodiments, a diameter of the first phasing plug is greater than a diameter of the second phasing plug.

In one or more embodiments, the extension duct is generally cylindrical. In one or more embodiments, the inner surface of the extension duct includes a plurality of spaced members defining acoustic channels therebetween. In one or more embodiments, each of the plurality of spaced members are wider at the bottom end of the extension duct compared with the top end, such that the acoustic channels expand from the bottom end of the extension duct to the top end of the extension duct.

In one or more embodiments, the first motor assembly includes a first annular magnet and the second motor assembly includes a second annular magnet. In one or more embodiments, the first plurality of apertures and the second plurality of apertures are each arranged generally circumferentially about the central axis. In one or more embodiments, the first plurality of apertures and the second plurality of apertures each have a zig zag configuration around the central axis.

In one or more embodiments, the output side of the first phasing plug includes a first plurality of radial channels extending outwardly from the first plurality of apertures, and the output side of the second phasing plug includes a second plurality of radial channels extending outwardly from the second plurality of apertures, the first plurality of radial channels and the second plurality of radial channels forming part of a shared acoustic path for the merged acoustic signals toward the annular pathway. In one or more embodiments, the first plurality of radial channels expand in width from the first plurality of apertures toward an outer edge of the first phasing plug, and the second plurality of radial channels expand in width from the second plurality of apertures toward an outer edge of the second phasing plug.

In one or more embodiments, the first phasing plug includes a first base portion and a first mounting portion extending downwardly from the first base portion on the input side of the first phasing plug for mounting to the first motor assembly, and the second phasing plug includes a second base portion and a second mounting portion extending upwardly from the second base portion on the input side of the second phasing plug for mounting to the second motor assembly.

In one or more embodiments, a first compression chamber is defined between the input side of the first phasing plug and the first annular diaphragm, and a second compression chamber is defined between the input side of the second phasing plug and the second annular diaphragm, the first plurality of apertures forming an exit to the first compression chamber and the second plurality of apertures forming an exit to the second compression chamber.

In one or more embodiments, a dual compression driver includes a first driver assembly including a first motor assembly disposed about a central axis at a first end of the dual compression driver, a first annular diaphragm disposed coaxially above and operably connected to the first motor assembly, and a first phasing plug disposed coaxially above the first annular diaphragm, the first phasing plug including an input side oriented toward the first annular diaphragm and an output side oriented away from the first annular diaphragm, the first phasing plug including a first plurality of apertures extending therethrough. A second driver assembly includes a second motor assembly disposed about the central axis at a second end of the dual compression driver, a second annular diaphragm disposed coaxially below and operably connected to the second motor assembly, and a second phasing plug disposed coaxially below the second annular diaphragm, the second phasing plug including an input side oriented toward the second annular diaphragm and an output side oriented away from the second annular diaphragm, the second phasing plug including a second plurality of apertures extending therethrough. A hollow extension duct has a bottom end mounted to the first phasing plug and a top end extending toward the second end of the dual compression driver. A housing is mounted to the second driver assembly at the second end of the dual compression driver, wherein an inner surface of the extension duct and an outer surface of the housing form an annular pathway terminating at an annular exit at the second end of the dual compression driver. Acoustic signals from the first plurality of apertures merge with acoustic signals from the second plurality of apertures between the output side of the first phasing plug and the output side of the second phasing plug and radiate radially outward to the annular pathway and through the annular exit.

In one or more embodiments, the extension duct has a generally frustoconical shape, expanding in width from the bottom end of the extension duct to the top end of the extension duct, and the housing substantially surrounds the second driver assembly, with the top end of the housing wider than the bottom end of the housing.

In one or more embodiments, a transducer includes a dual compression driver and a waveguide. The dual compression driver includes a first driver assembly including a first motor assembly disposed about a central axis at a first end of the dual compression driver, a first annular diaphragm disposed coaxially above and operably connected to the first motor assembly, and a first phasing plug mounted to the first motor assembly coaxially above the first annular diaphragm, the first phasing plug including an input side oriented toward the first annular diaphragm and an output side oriented away from the first annular diaphragm, the first phasing plug including a first plurality of apertures extending therethrough. The dual compression driver further includes a second driver assembly including a second motor assembly disposed about the central axis at a second end of the dual compression driver, a second annular diaphragm disposed coaxially below and operably connected to the second motor assembly, and a second phasing plug mounted to the second motor assembly coaxially below the second annular diaphragm, the second phasing plug including an input side oriented toward the second annular diaphragm and an output side oriented away from the second annular diaphragm, the second phasing plug including a second plurality of apertures extending therethrough. A hollow extension duct has a bottom end mounted to the first phasing plug and a top end extending toward the second end of the dual compression driver, wherein an inner surface of the extension duct and an outer surface of the second driver assembly form an annular waveguide terminating at an annular exit at the second end of the dual compression driver. Acoustic signals from the first plurality of apertures merge with acoustic signals from the second plurality of apertures between the output side of the first phasing plug and the output side of the second phasing plug and radiate radially outward to the annular waveguide and through the annular exit. The waveguide is disposed on the top end of the extension duct and has an annular inlet adjacent the annular exit of the dual compression driver.

In one or more embodiments, the extension duct includes an upper flange for mounting the waveguide. In one or more embodiments, the waveguide includes a rectangular outlet.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is understood that directional identifiers such as, but not limited to, top, bottom, above, below, upper, lower, upwardly and downwardly used herein for descriptive purposes are not intended to be limiting, and are simply used to provide an exemplary environment for the components of the dual compression driver as disclosed herein. Any directional terms as used herein are merely to indicate the relative placement of various components of the dual compression driver and are not intended to limit components to any particular orientation in space.

The configuration of existing dual compression drivers does not allow for an annular exit because the acoustic signals are directed from the adjacent phasing plugs inward through the radial channels and then axially toward the circular exit of the dual driver. The disclosed embodiments make it possible to have an annular exit in the dual compression driver by directing the output acoustic signals radially, and not inward, but outward in each phasing plug. This configuration merges the acoustic signals from two driver assemblies and radiates the merged acoustic signals outward and then upward toward the annular exit. The conduit for the signal propagation to the annular exit is formed by the external cylindrical surface of the dual driver and an extension duct attached to the rear phasing plug, as described further below. Embodiments disclosed herein are scalable and advantageous for various applications, especially in line arrays.

With reference first to FIGS. 1-4, a dual compression driver 100 with an annular exit is disclosed herein including a first, rear driver assembly 102 and a second, front driver assembly 104 which may be utilized in a transducer or loudspeaker. The first driver assembly 102 and the second driver assembly 104 may be configured to operate in the same frequency range or in different frequency ranges. The various components of the dual compression driver 100 may be disposed generally about a central axis 106.

Figure 1:
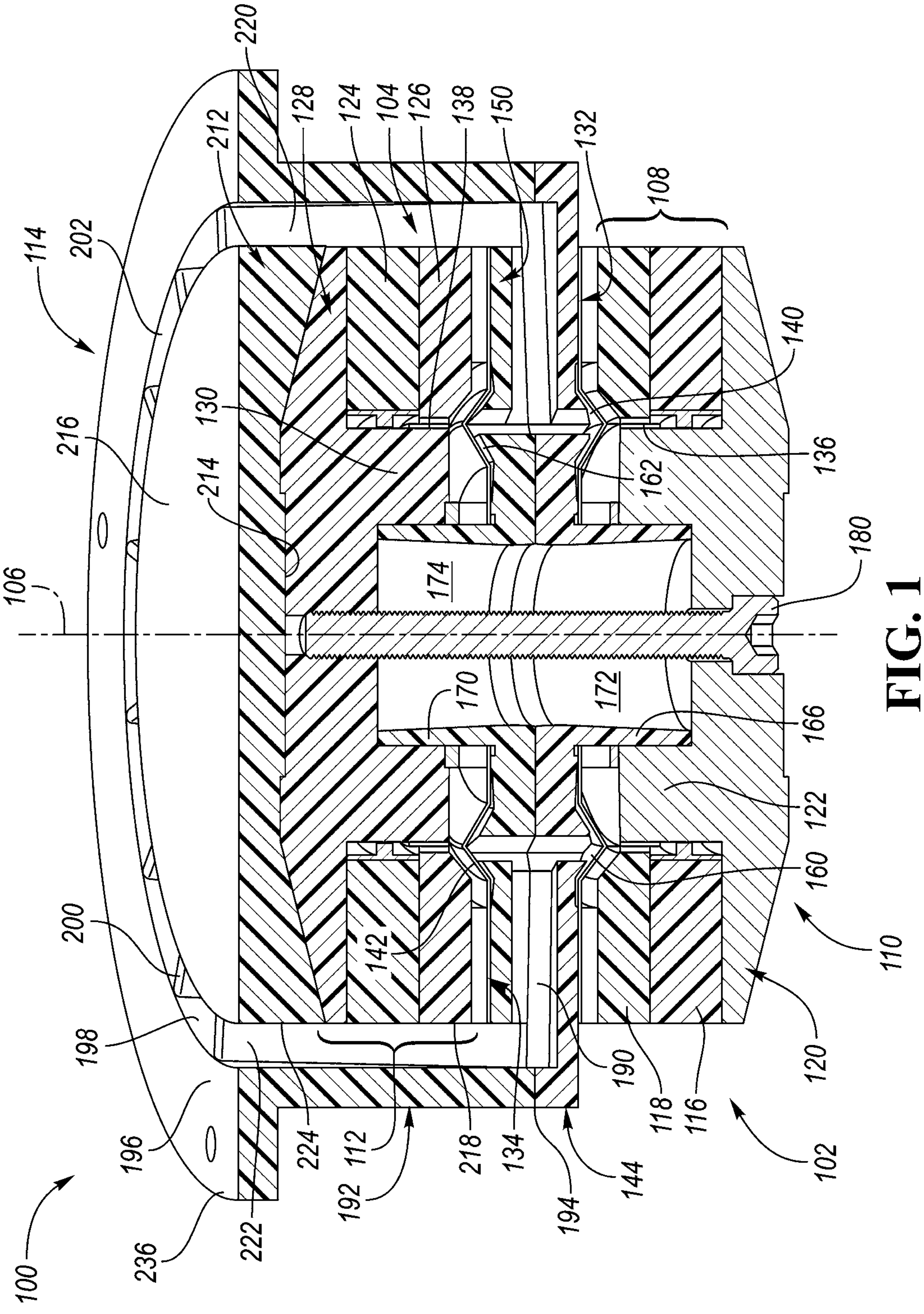
FIG. 1 is a cross-sectional view of a dual compression driver with an annular exit according to one or more embodiments.
Figure 2:
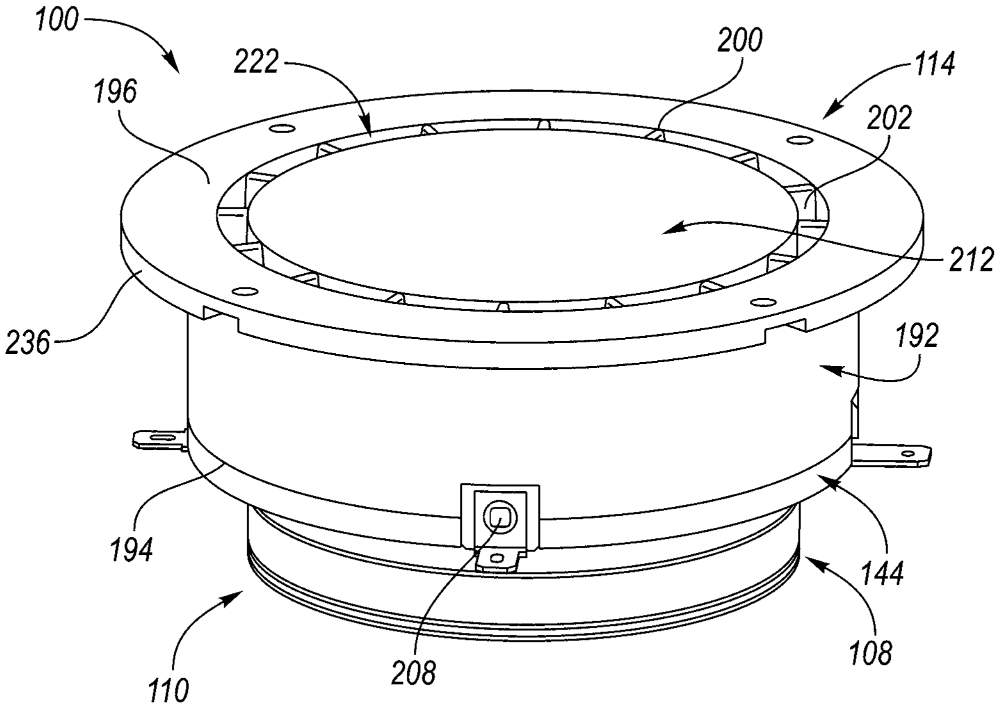
FIG. 2 is a perspective view of the dual compression driver according to one or more embodiments.
Figure 3:
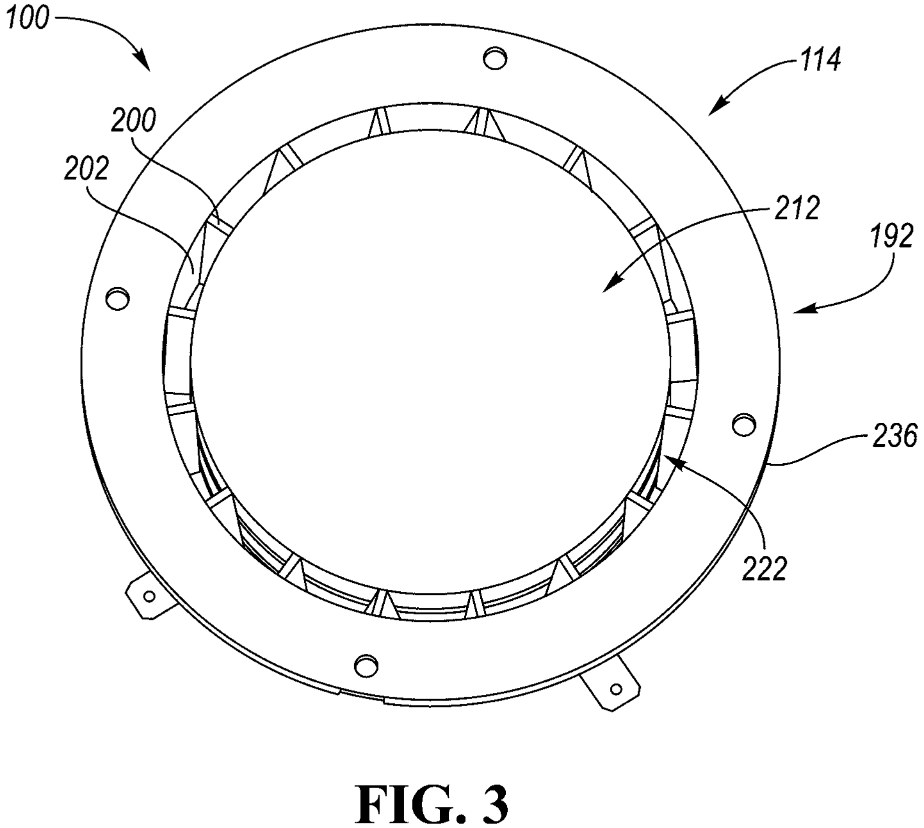
FIG. 3 is a top view of the dual compression driver according to one or more embodiments.
Figure 4:
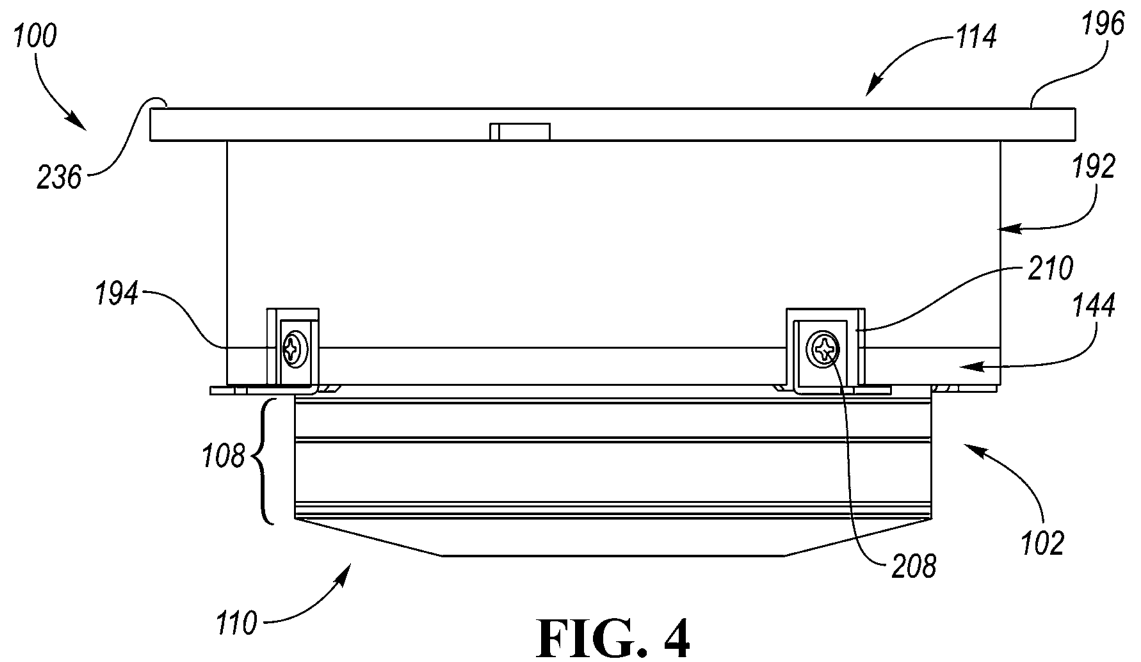
FIG. 4 is a side view of the dual compression driver according to one or more embodiments.

As shown in the cross-sectional view of FIG. 1, the first driver assembly 102 includes a first motor assembly 108 disposed about the central axis 106 at a first end 110 of the dual compression driver 100, and the second driver assembly 104 includes a second motor assembly 112 disposed about the central axis 106 at a second end 114 of the dual compression driver 100. In one or more embodiments, the first motor assembly 108 may comprise a first annular permanent magnet 116 disposed between a first annular top plate 118 and a first back plate 120 that includes a centrally disposed cylindrical or annular first pole piece 122, and the second motor assembly 112 may comprise a second annular permanent magnet 124 disposed between a second annular top plate 126 and a second back plate 128 that includes a centrally disposed cylindrical or annular second pole piece 130. However, it is understood that the first motor assembly 108 and the second motor assembly 112 are not limited to this construction.

With continuing reference to FIG. 1, a first annular flexural diaphragm 132 is disposed coaxially above and operably connected to the first motor assembly 108, and a second annular flexural diaphragm 134 is disposed coaxially below and operably connected to the second motor assembly 112. In one or more embodiments, the first annular diaphragm 132 and the second annular diaphragm 134 may be constructed from a polymer film. The first motor assembly 108 provides a permanent magnetic field for electrodynamic coupling with a first voice coil 136, wherein the first voice coil 136 is mechanically coupled to the first annular diaphragm 132 and produces movement of the flexible portion of the first annular diaphragm 132 to convert received electrical signals into acoustic signals (sound waves). Likewise, the second motor assembly 112 provides a permanent magnetic field for electrodynamic coupling with a second voice coil 138, wherein the second voice coil 138 is mechanically coupled to the second annular diaphragm 134 and produces movement of the flexible portion of the second annular diaphragm 134 to convert received electrical signals into acoustic signals. The first annular diaphragm 132 and the second annular diaphragm 134 may each include a profiled section such as a first V-shaped section 140 and a second V-shaped section 142, respectively, with a flat "wing" on either side thereof, or the first annular diaphragm 132 and the second annular diaphragm 134 may have other suitable configurations.

Turning now to FIGS. 5-8, a first phasing plug 144 is disposed coaxially above the first annular diaphragm 132 and includes a first input side 146 oriented toward the first annular diaphragm 132 and an output side 148 oriented away from the first annular diaphragm 132. A second phasing plug 150 is disposed coaxially below the second annular diaphragm 134 and includes a second input side 152 oriented toward the second annular diaphragm 134 and a second output side 154 oriented away from the second annular diaphragm 134. The first phasing plug 144 includes a first plurality of apertures 156 extending therethrough from the first input side 146 to the first output side 148, and the second phasing plug 150 includes a second plurality of apertures 158 extending therethrough from the second input side 152 to the second output side 154.

In a compression driver, the diaphragm is loaded by a compression chamber, which is a thin layer of air separating the diaphragm from the phasing plug. In the embodiments disclosed herein, and as best shown in FIG. 1, a first compression chamber 160 is defined between the first input side 146 and the first annular diaphragm 132, where the first plurality of apertures 156 form an exit to the first compression chamber 160. A second compression chamber 162 is defined between the second input side 152 and the second annular diaphragm 134, where the second plurality of apertures 158 form an exit to the second compression chamber 162. The volume of air entrapped in the compression chamber is characterized by an acoustical compliance which is proportional to the volume of compression chamber. In practice, the height of the compression chamber may be quite small (e.g., approximately 0.5 mm or less) such that the volume of the compression chamber is also small. The small radial dimension of the first annular diaphragm 132 and the second annular diaphragm 134 corresponds to the small radial dimensions of the matching compression chamber 160, 162, which shifts undesirable air resonances (cross-modes) in the compression chamber 160, 162 to higher frequencies, sometimes above the audio range.

Figure 5:
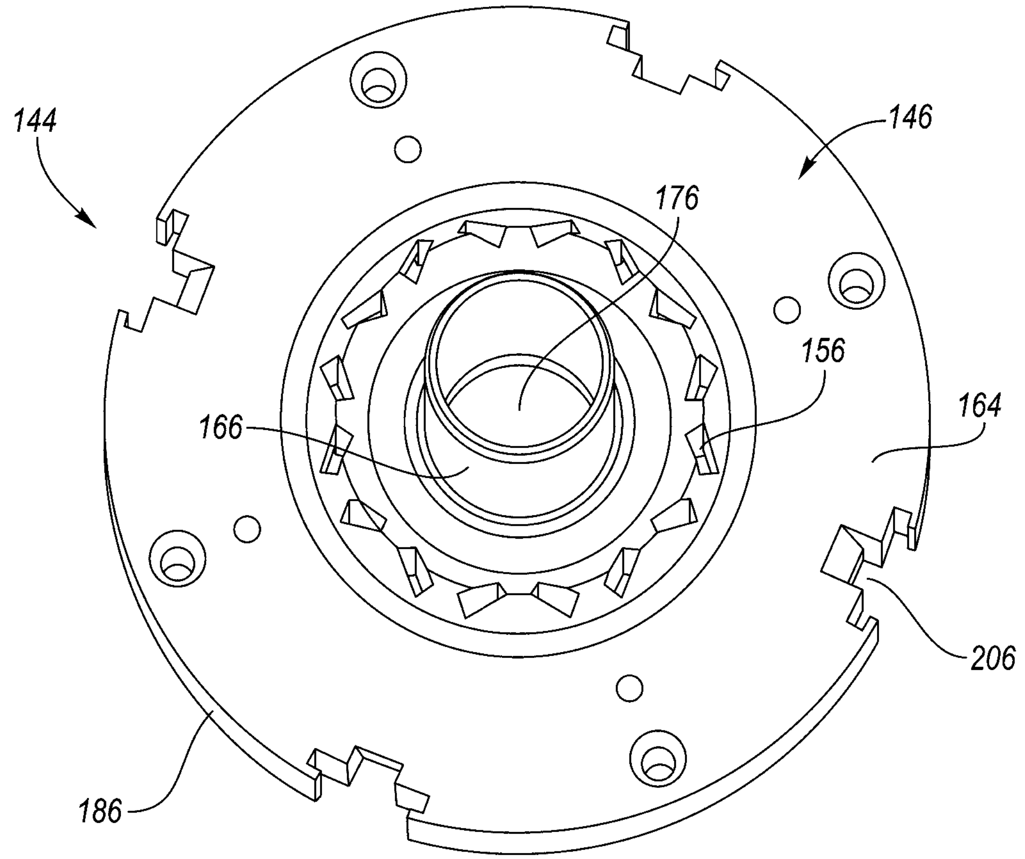
FIG. 5 is a perspective view of an input side of a rear phasing plug according to one or more embodiments.
Figure 6:
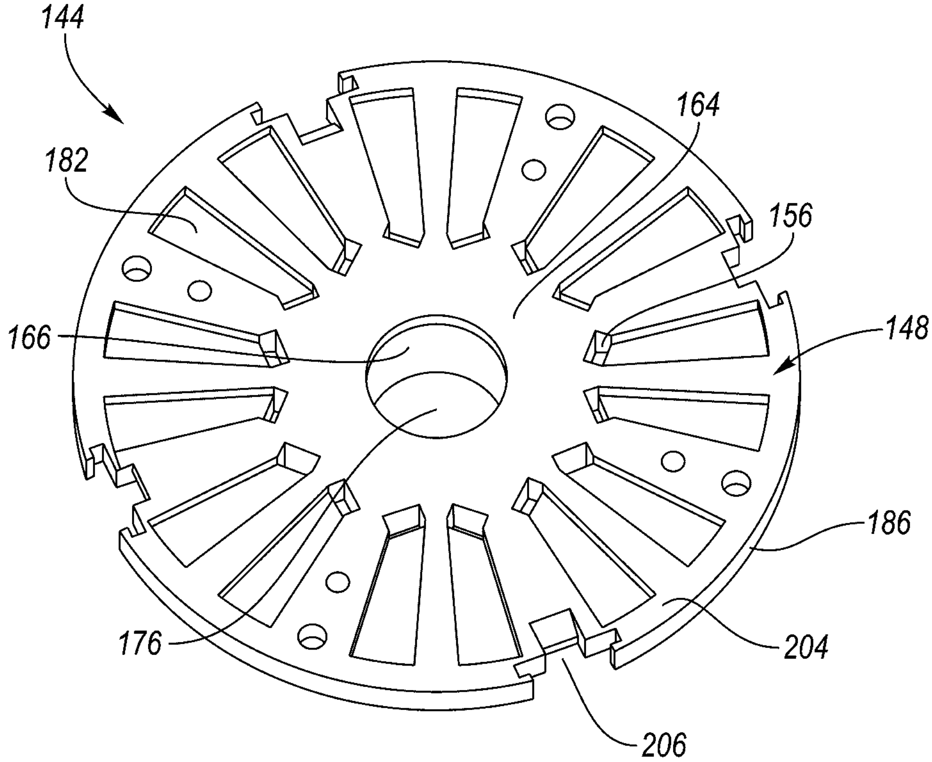
FIG. 6 is a perspective view of an output side of the rear phasing plug according to one or more embodiments.
Figure 7:
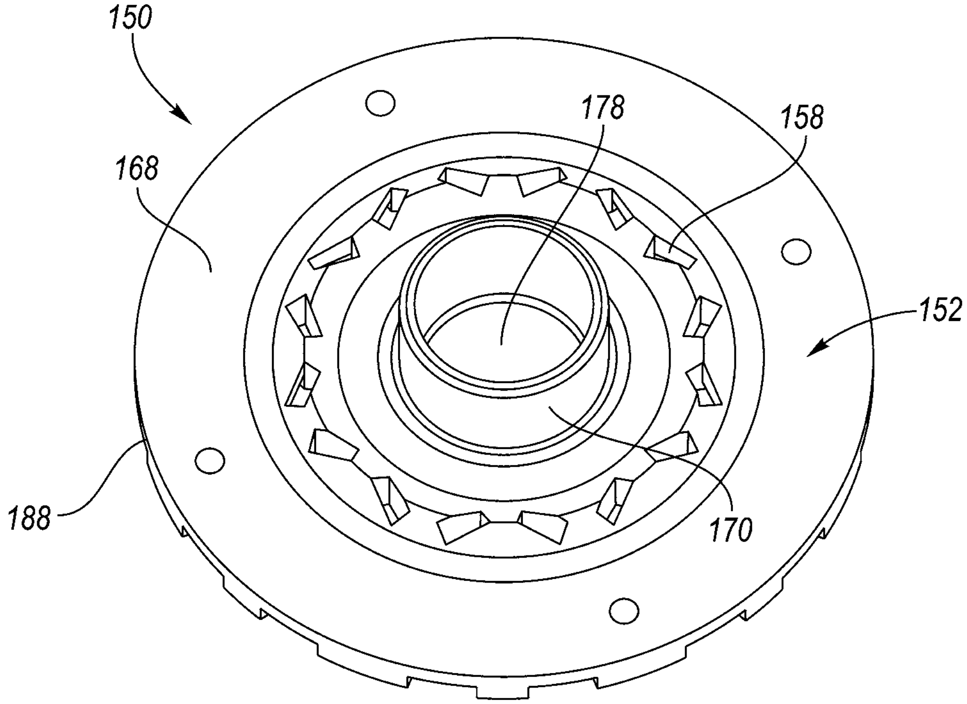
FIG. 7 is a perspective view of an output side of a front phasing plug according to one or more embodiments.
Figure 8:
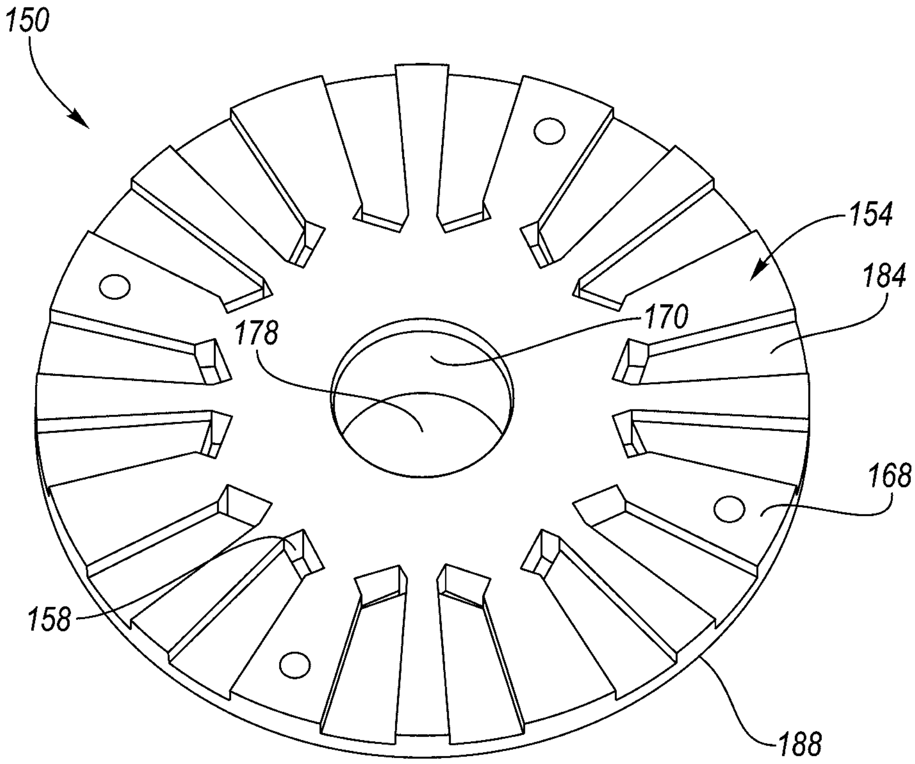
FIG. 8 is a perspective view of an input side of the front phasing plug according to one or more embodiments.

In one or more embodiments, the first phasing plug 144 may include a first base portion 164 and a first mounting portion 166 extending downwardly from the first base portion 164 on the first input side 146 for mounting the first phasing plug 144 to the first motor assembly 108 (FIGS. 5-6). Correspondingly, the second phasing plug 150 may include a second base portion 168 and a second mounting portion 170 extending axially downwardly from the second base portion 168 on the second input side 152 for mounting the second phasing plug 150 to the second motor assembly 112 (FIGS. 7-8). In one or more embodiments, each of the first base portion 164 and the second base portion 168 may be generally disk-shaped and lie in a plane orthogonal to the central axis 106. The first mounting portion 166 may be a hollow cylinder arranged to be press fit into a first recess 172 formed in the first pole piece 122, and the second mounting portion 170 may be a hollow cylinder arranged to be press fit into a second recess 174 formed in the second pole piece 130, as illustrated in FIG. 1. However, it is understood that the first mounting portion 166 and the second mounting portion 170 may have any configuration suitable for coupling the first phasing plug 144 and the second phasing plug 150 to the first motor assembly 108 and the second motor assembly 112, respectively.

A first central bore 176 coaxial with the central axis 106 is formed through a thickness (axial direction) of the first base portion 164, and a second central bore 178 coaxial with the central axis 106 is formed through a thickness of the second base portion 168, through which a fastener 180 may secure the first driver assembly 102 to the second driver assembly 104 (see FIG. 1). In general, components of the first driver assembly 102 and the second driver assembly 104 may be connected together by fasteners or adhesives.

Acoustic signals created by the first annular diaphragm 132 travel through the first plurality of apertures 156 which serve as an entrance to the first phasing plug 144, and acoustic signals created by the second annular diaphragm 134 travel through the second plurality of apertures 158 which serve as an entrance to the second phasing plug 150. Accordingly, the area of the entrance to the first phasing plug 144 and to the second phasing plug 150 is significantly smaller than the area of the first annular diaphragm 132 and the second annular diaphragm 134, respectively. As illustrated in FIGS. 5-8, the first plurality of apertures 156 and the second plurality of apertures 158 may each be arranged generally circumferentially about the central axis 106, generally forming a circle. In one or more embodiments, the first plurality of apertures 156 and the second plurality of apertures 158 each have a "zig-zag" or sawtooth type configuration arranged generally circumferentially about the central axis 106 as shown. Such a meandering configuration of the apertures 156, 158 helps to mitigate any adverse influence of diaphragm breakups on frequency response, and may have the effect of smearing the air resonances in the first and second compression chambers 160, 162 so as to shape and improve the wavefront exiting the dual compression driver 100. However, the first plurality of apertures 156 and the second plurality of apertures 158 are not limited to the embodiments depicted herein and may include other suitable shapes and configurations.

Figure 12:
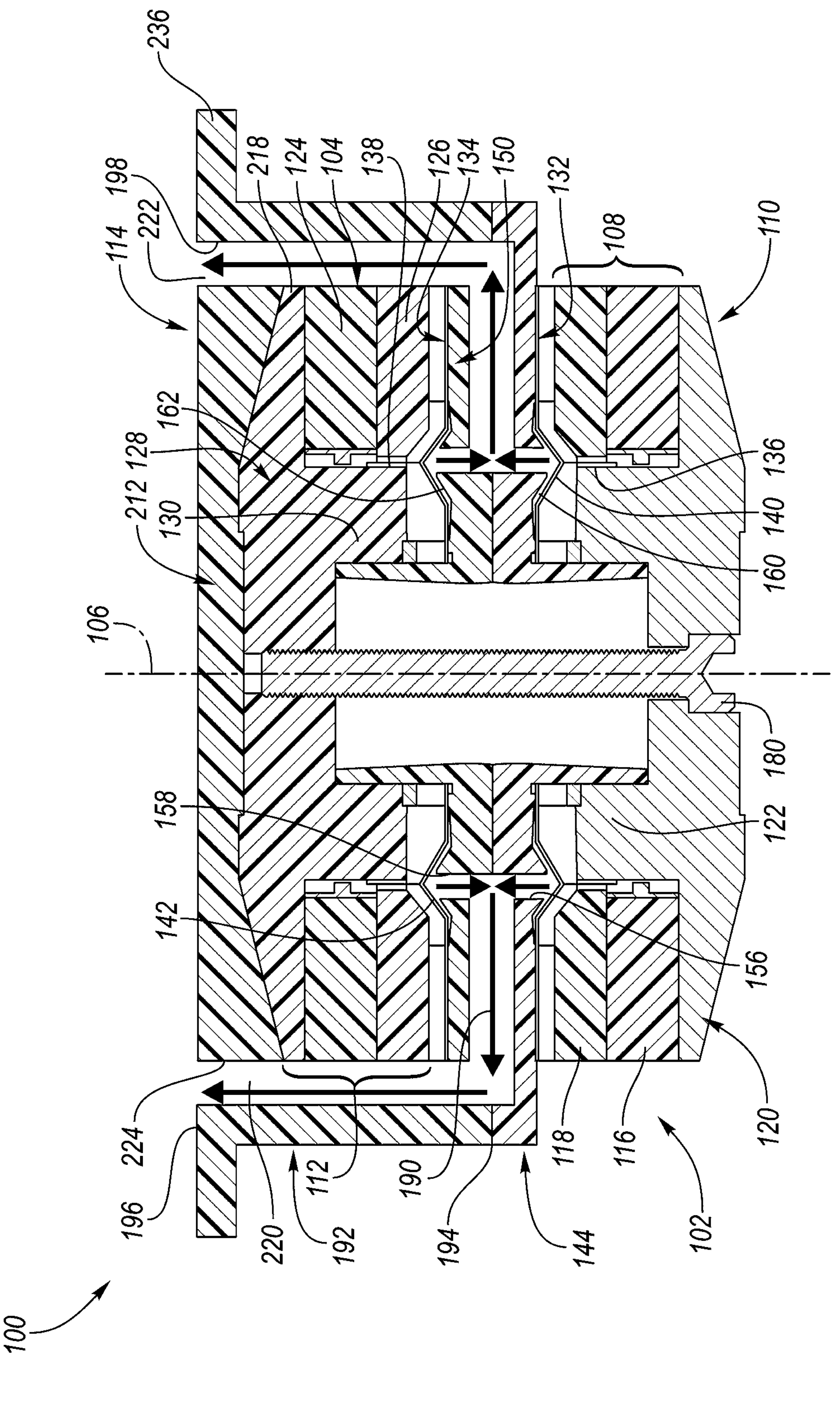
FIG. 12 is a schematic cross-sectional view of the dual compression driver illustrating the acoustical path through the driver to the annular exit.
Figure 13:
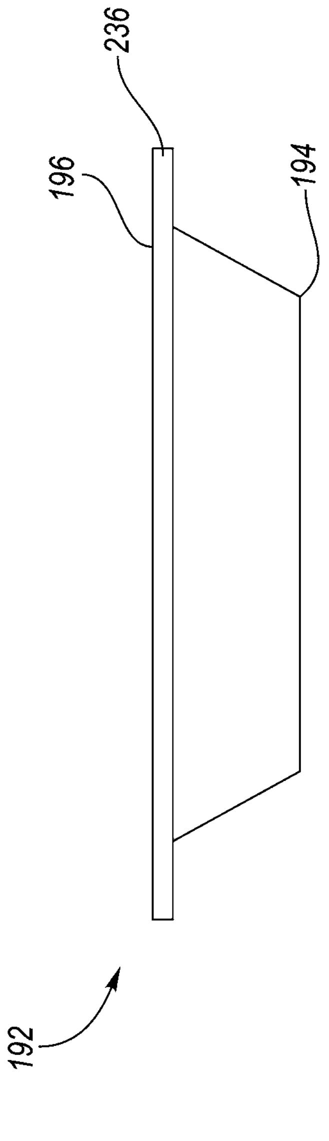
FIG. 13 is a side view of a conical extension duct for the dual compression driver according to one or more embodiments.
Figure 15:
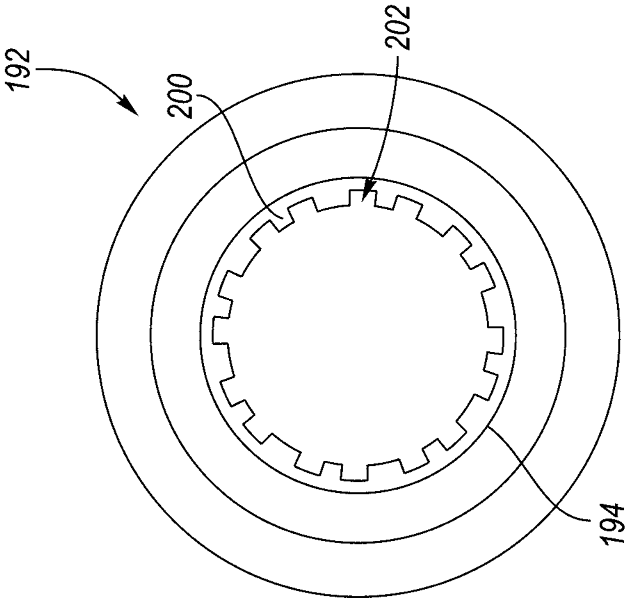
FIG. 15 is a bottom view of the conical extension duct of FIG. 13.

In one or more embodiments, the first output side 148 includes a first plurality of radial channels 182 (FIG. 6) extending outwardly from the first plurality of apertures 156, and the second output side 154 includes a second plurality of radial channels 184 (FIG. 8) extending outwardly from the second plurality of apertures 158. Each aperture 156, 158 is therefore acoustically connected to a corresponding radial channel 182, 184. In one or more embodiments, the first plurality of radial channels 182 expand in width from the first plurality of apertures 156 toward a first outer edge 186 of the first phasing plug 144, and the second plurality of radial channels 184 expand in width from the second plurality of apertures 158 toward a second outer edge 188 of the second phasing plug 150, providing a natural outward expansion of the wavefront. As best shown in FIG. 12, in the embodiments disclosed herein, the first output side 148 faces the second output side 154, such that the first plurality of radial channels 182 and the second plurality of radial channels 184 form part of a shared acoustic path 190 for the merging acoustic signals from the first driver assembly 102 and the second driver assembly 104.

Figure 9:
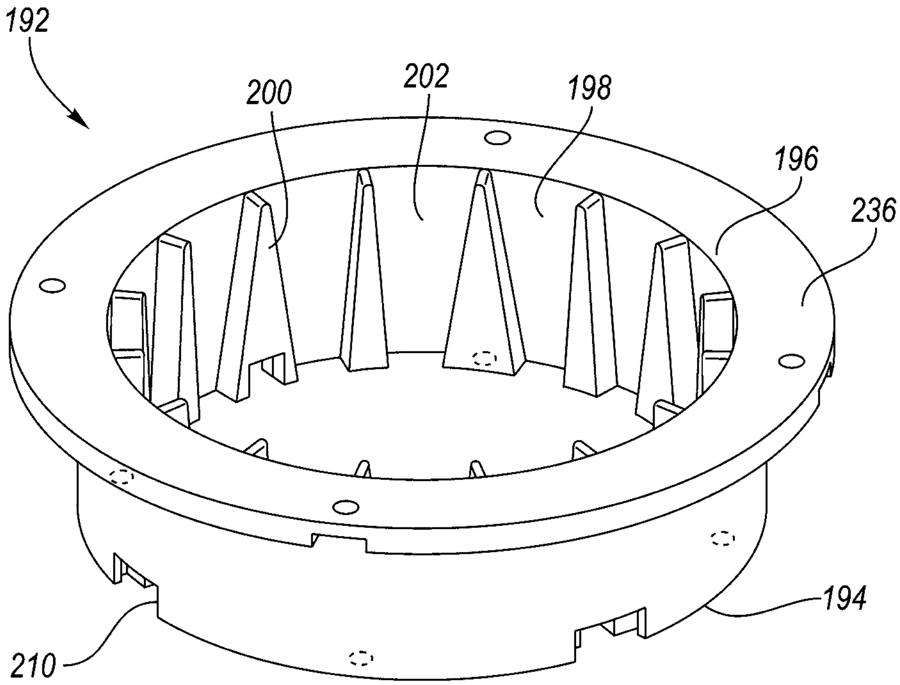
FIG. 9 is a perspective view of a hollow extension duct for the dual compression driver according to one or more embodiments.
Figure 10:
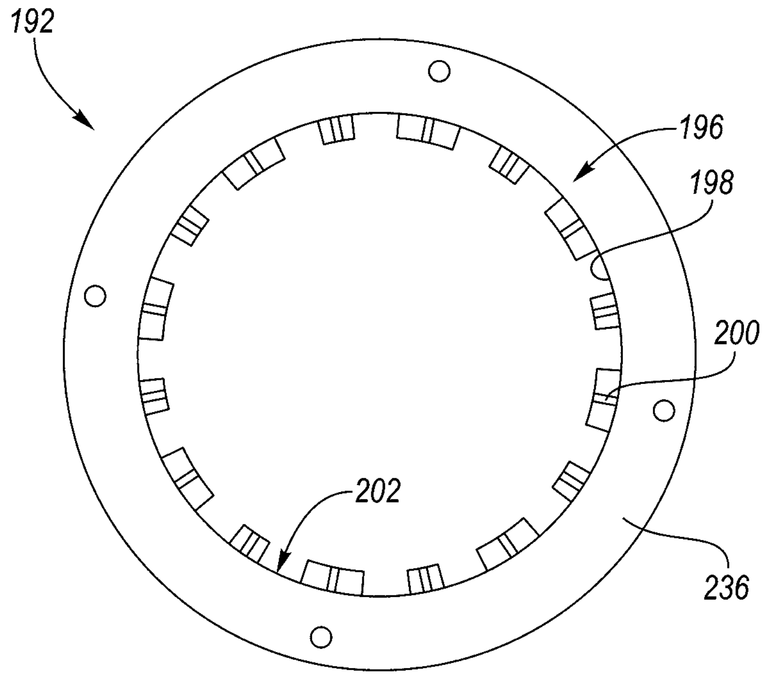
FIG. 10 is a top view of the extension duct of FIG. 5.
Figure 11:
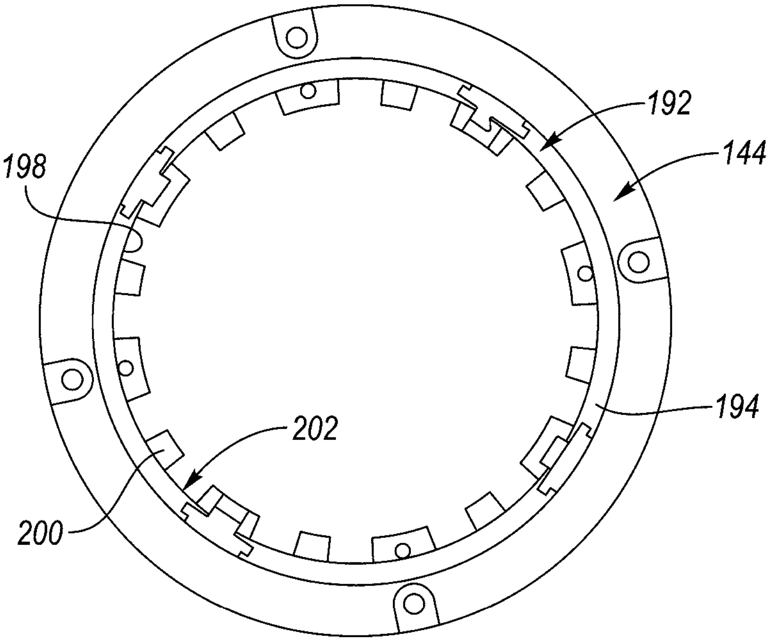
FIG. 11 is a bottom view of the extension duct of FIG. 5 mounted on the first phasing plug.

Referring now to FIGS. 9-11, the dual compression driver 100 further includes a hollow extension duct 192 having a bottom end 194 mounted to the first driver assembly 102, such as to the first phasing plug 144, and a top end 196 extending toward the second end 114 of the dual compression driver 100. As such, the extension duct 192 may act as an extension of the first phasing plug 144.

Figure 14:
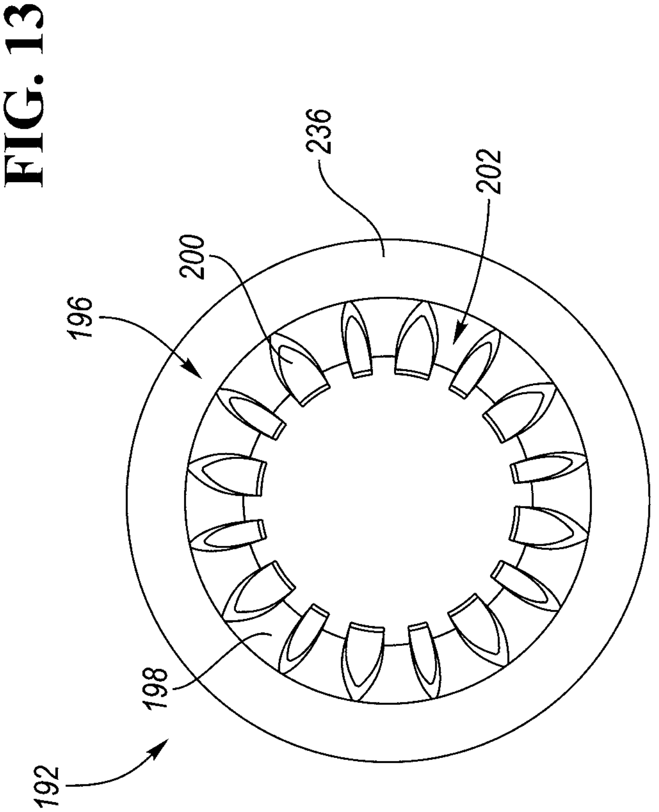
FIG. 14 is a top view of the conical extension duct of FIG. 13.

In one or more embodiments, the extension duct 192 may be generally cylindrical, with an inner surface 198 of the extension duct 192 including a plurality of spaced members 200 protruding from the inner surface 198 and defining acoustic channels 202 therebetween. In one or more embodiments, each of the plurality of spaced members 200 are wider at the bottom end 194 of the extension duct 192 compared with the top end 196 thereof, such that the acoustic channels 202 expand from the bottom end 194 to the top end 196 of the extension duct 192. In one or more embodiments, the plurality of spaced members 200 may have a shape which is generally triangular or which has a "bullet"-shaped, rounded profile (see FIG. 14), but are not limited to these configurations. The plurality of spaced members 200 may either be uniform or non-uniform in size (e.g. width).

In one or more embodiments, a diameter of the first phasing plug 144 is greater than a diameter of the second phasing plug 150 as illustrated in FIGS. 1 and 12 to provide an easily accessible mounting region for the extension duct 192. With reference to FIG. 6, in the first phasing plug 144, the first plurality of radial channels 182 may terminate inboard of the first outer edge 186, providing a mounting region 204 for seating the extension duct 192 around the perimeter of the first phasing plug 144. The mounting region 204 may include spaced recesses 206 for receiving fasteners 208 to mount the extension duct 192 to the first phasing plug 144. Correspondingly, the extension duct 192 may include spaced holes 210 therethrough at the bottom end 194 for receiving the fasteners 208 to secure the extension duct 192 to the first phasing plug 144.

With reference to FIGS. 1-3 and 12, in one or more embodiments the second driver assembly 104 includes a housing 212 mounted at the second end 114 of the dual compression driver 100. The housing 212 has a bottom surface 214 disposed on or attached to the second driver assembly 104, and a top surface 216 forming an outer surface of the second end 114 of the dual compression driver 100. As best shown in FIGS. 1 and 12, the inner surface 198 of the extension duct 192 and an outer surface 218 of the second driver assembly 104 together form an annular pathway 220 terminating at an annular exit 222 at the second end 114 of the dual compression driver 100. An outer, side surface 224 of the housing 212 may form at least part of the annular pathway 220. In operation, acoustic signals from the first plurality of apertures 156 merge with acoustic signals from the second plurality of apertures 158 between the first output side 148 and the second output side 154 and radiate radially outward to the annular pathway 220 where the acoustic channels 202 provide a natural upward expansion of the wavefront out through the annular exit 222 of the dual compression driver 100. The overall acoustical cross-sectional area of the air paths, including the first and second plurality of apertures 156, 158, the first and second plurality of radial channels 182, 184, and the acoustic channels 202, gradually increase to provide a smooth transition of acoustic signals through the dual compression driver 100.

Figure 16:
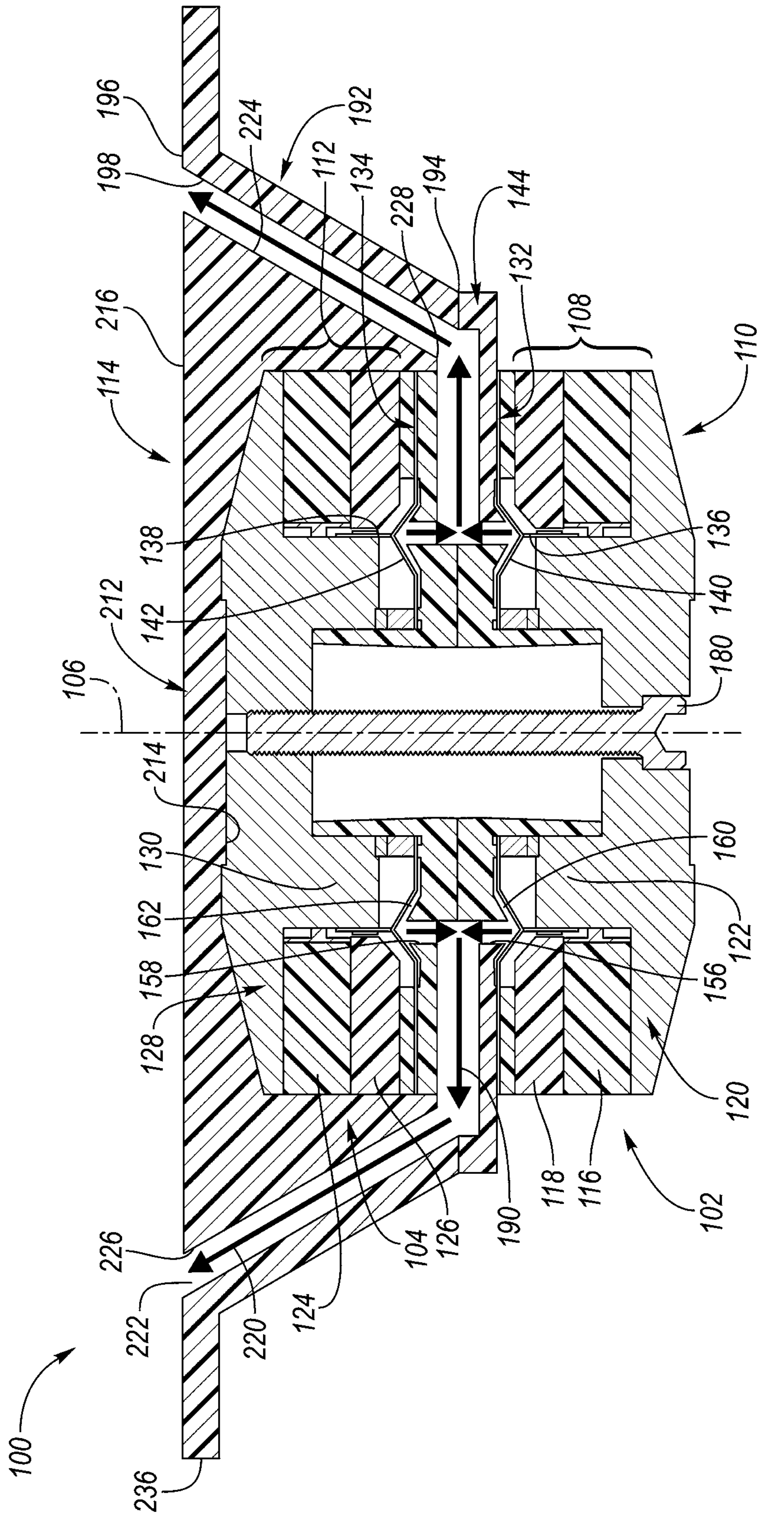
FIG. 16 is a schematic cross-sectional view of a dual compression driver with a conical extension duct according to one or more embodiments.

As shown in FIGS. 13-16, in one or more embodiments, the extension duct 192 may alternatively have a generally frustoconical shape, expanding in width from the bottom end 194 to the top end 196. Instead of a transition angle from the shared acoustic path 190 to the annular pathway 220 of about 90 degrees as in the embodiment of FIGS. 9-11, in this embodiment the transition angle may be approximately 120 degrees. As best shown in FIG. 16, the housing 212 may substantially surround the second driver assembly 104, with the housing top end 226 wider than the housing bottom end 228, and with the side surface 224 having a generally straight, smooth contour from the bottom end 194 to the top end 196. The annular pathway 220 may thus be formed by the inner surface 198 of the extension duct 192 and the outer, side surface 224 of the housing 212.

Figure 17:
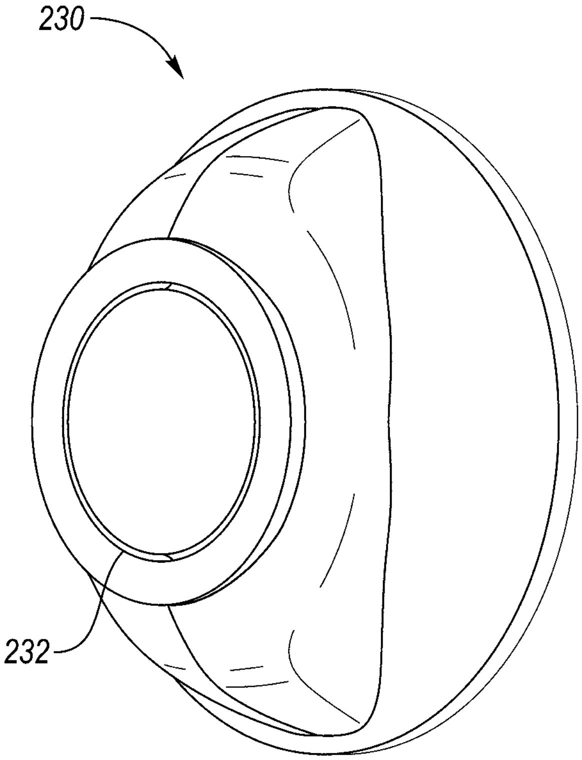
FIG. 17 is a bottom perspective view of a corresponding waveguide with an annular entrance for use with the dual compression driver with an annular exit according to one or more embodiments.
Figure 18:
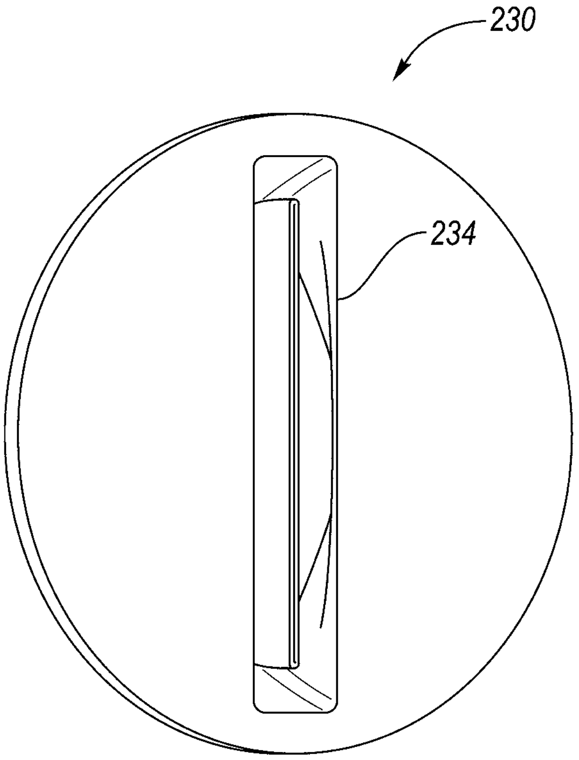
FIG. 18 is a front perspective view of the waveguide of FIG. 17 depicting a rectangular exit of the waveguide according to one or more embodiments.

An exemplary waveguide 230 for the dual compression driver 100 is illustrated in FIGS. 17-18. In one or more embodiments, the waveguide 230 may have an annular inlet 232 and a rectangular outlet 234. The waveguide 230 may function to control directivity of sound waves (i.e., coverage of sound pressure over a particular listening area) that propagate out of the dual compression driver 100 into the ambient environment and to increase reproduced SPL over a certain frequency range. The rectangular outlet 234 has a smaller dimension in the horizontal plane and a larger dimension in vertical plane, therefore providing wide directivity response (wider dispersion) in the horizontal plane and narrower dispersion in the vertical plane. Such a configuration is optimal to form a cylindrical wavefront as required in a cluster of line arrays, although the waveguide 230 is not limited to this configuration. The waveguide 230 may be received and mounted on the top end 196 of the extension duct 192 with the annular inlet 232 adjacent to and aligned with the annular exit 222 of the dual compression driver 100. In one or more embodiments, the extension duct 192 may include an upper flange 236 for receiving and mounting the waveguide 230. From the annular exit 222 of the dual compression driver 100, the sound waves enter and radiate through the waveguide 230, through the rectangular outlet 234, and propagate into the ambient environment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual compression driver, comprising:

a first driver assembly including a first motor assembly disposed about a central axis at a first end of the dual compression driver, a first annular diaphragm disposed coaxially above and operably connected to the first motor assembly, and a first phasing plug disposed coaxially above the first annular diaphragm, the first phasing plug including an input side oriented toward the first annular diaphragm and an output side oriented away from the first annular diaphragm, the first phasing plug including a first plurality of apertures extending therethrough;

a second driver assembly including a second motor assembly disposed about the central axis at a second end of the dual compression driver, a second annular diaphragm disposed coaxially below and operably connected to the second motor assembly, and a second phasing plug disposed coaxially below the second annular diaphragm, the second phasing plug including an input side oriented toward the second annular diaphragm and an output side oriented away from the second annular diaphragm, the second phasing plug including a second plurality of apertures extending therethrough; and a hollow extension duct having a bottom end mounted to the first phasing plug and a top end extending toward the second end of the dual compression driver, wherein an inner surface of the extension duct and an outer surface of the second driver assembly form an annular pathway terminating at an annular exit at the second end of the dual compression driver, wherein acoustic signals from the first plurality of apertures merge with acoustic signals from the second plurality of apertures between the output side of the first phasing plug and the output side of the second phasing plug and radiate radially outward to the annular pathway and through the annular exit.

2. The dual compression driver of claim 1, wherein the second driver assembly includes a housing mounted at the second end of the dual compression driver, a side surface of the housing forming at least part of the annular pathway.

3. The dual compression driver of claim 1, wherein a diameter of the first phasing plug is greater than a diameter of the second phasing plug.

4. The dual compression driver of claim 1, wherein the extension duct is generally cylindrical.

5. The dual compression driver of claim 1, wherein the inner surface of the extension duct includes a plurality of spaced members defining acoustic channels therebetween.

6. The dual compression driver of claim 5, wherein each of the plurality of spaced members are wider at the bottom end of the extension duct compared with the top end, such that the acoustic channels expand from the bottom end of the extension duct to the top end of the extension duct.

7. The dual compression driver of claim 1, wherein the first motor assembly includes a first annular magnet and the second motor assembly includes a second annular magnet.

8. The dual compression driver of claim 1, wherein the first plurality of apertures and the second plurality of apertures are each arranged generally circumferentially about the central axis.

9. The dual compression driver of claim 8, wherein the first plurality of apertures and the second plurality of apertures each have a zig zag configuration around the central axis.

10. The dual compression driver of claim 1, wherein the output side of the first phasing plug includes a first plurality of radial channels extending outwardly from the first plurality of apertures, and the output side of the second phasing plug includes a second plurality of radial channels extending outwardly from the second plurality of apertures, the first plurality of radial channels and the second plurality of radial channels forming part of a shared acoustic path for the merged acoustic signals toward the annular pathway.

11. The dual compression driver of claim 10, wherein the first plurality of radial channels expand in width from the first plurality of apertures toward an outer edge of the first phasing plug, and the second plurality of radial channels expand in width from the second plurality of apertures toward an outer edge of the second phasing plug.

12. The dual compression driver of claim 1, wherein the first phasing plug includes a first base portion and a first mounting portion extending downwardly from the first base portion on the input side of the first phasing plug for mounting to the first motor assembly, and the second phasing plug includes a second base portion and a second mounting portion extending upwardly from the second base portion on the input side of the second phasing plug for mounting to the second motor assembly.

13. The dual compression driver of claim 1, wherein a first compression chamber is defined between the input side of the first phasing plug and the first annular diaphragm, and a second compression chamber is defined between the input side of the second phasing plug and the second annular diaphragm, the first plurality of apertures forming an exit to the first compression chamber and the second plurality of apertures forming an exit to the second compression chamber.

14. A dual compression driver, comprising:

a first driver assembly including a first motor assembly disposed about a central axis at a first end of the dual compression driver, a first annular diaphragm disposed coaxially above and operably connected to the first motor assembly, and a first phasing plug disposed coaxially above the first annular diaphragm, the first phasing plug including an input side oriented toward the first annular diaphragm and an output side oriented away from the first annular diaphragm, the first phasing plug including a first plurality of apertures extending therethrough;

a second driver assembly including a second motor assembly disposed about the central axis at a second end of the dual compression driver, a second annular diaphragm disposed coaxially below and operably connected to the second motor assembly, and a second phasing plug disposed coaxially below the second annular diaphragm, the second phasing plug including an input side oriented toward the second annular diaphragm and an output side oriented away from the second annular diaphragm, the second phasing plug including a second plurality of apertures extending therethrough;

a hollow extension duct having a bottom end mounted to the first phasing plug and a top end extending toward the second end of the dual compression driver; and a housing mounted to the second driver assembly at the second end of the dual compression driver, wherein an inner surface of the extension duct and an outer surface of the housing form an annular pathway terminating at an annular exit at the second end of the dual compression driver, wherein acoustic signals from the first plurality of apertures merge with acoustic signals from the second plurality of apertures between the output side of the first phasing plug and the output side of the second phasing plug and radiate radially outward to the annular pathway and through the annular exit.

15. The dual compression driver of claim 14, wherein the extension duct has a generally frustoconical shape, expanding in width from the bottom end of the extension duct to the top end of the extension duct, and wherein the housing substantially surrounds the second driver assembly, with the top end of the housing wider than the bottom end of the housing.

16. The dual compression driver of claim 14, wherein a diameter of the first phasing plug is greater than a diameter of the second phasing plug.

17. The dual compression driver of claim 14, wherein the inner surface of the extension duct includes a plurality of spaced members defining acoustic channels therebetween, wherein each of the plurality of spaced members are wider at the bottom end of the extension duct compared with the top end, such that the acoustic channels expand from the bottom end of the extension duct to the top end of the extension duct.

18. A transducer, comprising:

a dual compression driver including a first driver assembly including a first motor assembly disposed about a central axis at a first end of the dual compression driver, a first annular diaphragm disposed coaxially above and operably connected to the first motor assembly, and a first phasing plug mounted to the first motor assembly coaxially above the first annular diaphragm, the first phasing plug including an input side oriented toward the first annular diaphragm and an output side oriented away from the first annular diaphragm, the first phasing plug including a first plurality of apertures extending therethrough;

a second driver assembly including a second motor assembly disposed about the central axis at a second end of the dual compression driver, a second annular diaphragm disposed coaxially below and operably connected to the second motor assembly, and a second phasing plug mounted to the second motor assembly coaxially below the second annular diaphragm, the second phasing plug including an input side oriented toward the second annular diaphragm and an output side oriented away from the second annular diaphragm, the second phasing plug including a second plurality of apertures extending therethrough; and a hollow extension duct having a bottom end mounted to the first phasing plug and a top end extending toward the second end of the dual compression driver, wherein an inner surface of the extension duct and an outer surface of the second driver assembly form an annular waveguide terminating at an annular exit at the second end of the dual compression driver, wherein acoustic signals from the first plurality of apertures merge with acoustic signals from the second plurality of apertures between the output side of the first phasing plug and the output side of the second phasing plug and radiate radially outward to the annular waveguide and through the annular exit; and a waveguide disposed on the top end of the extension duct, the waveguide having an annular inlet adjacent the annular exit of the dual compression driver.

19. The transducer of claim 18, wherein the extension duct includes an upper flange for mounting the waveguide.

20. The transducer of claim 18, wherein the waveguide includes a rectangular outlet.

* * * * *